United States Patent [19]

Alitz

[11] Patent Number: 4,628,318

[45] Date of Patent: Dec. 9, 1986

[54] GROUND CLUTTER SUPPRESSION TECHNIQUE

[75] Inventor: Orville J. Alitz, Marion, Iowa

[73] Assignee: Rockwell International Corporation, El Segundo, Calif.

[21] Appl. No.: 557,679

[22] Filed: Dec. 2, 1983

[51] Int. Cl.$^4$ .............................................. G01S 13/95
[52] U.S. Cl. .................................................... 342/26
[58] Field of Search .................. 343/5 W, 17.1 R, 7.7, 343/5 DP, 5 CE, 7 A

[56] References Cited

U.S. PATENT DOCUMENTS 3,576,564 4/1971 Galvin ............................ 343/17.1 R

FOREIGN PATENT DOCUMENTS 0104265 8/1981 Japan ............................ 343/17.1 R Primary Examiner—Thomas H. Tarcza
Assistant Examiner—Donald E. Hayes, Jr.
Attorney, Agent, or Firm—Robert C. Mayes; George A. Montanye; H. Fredrick Hamann

[57] ABSTRACT

A ground clutter suppression technique is disclosed utilizing two parallel return signal processing paths, both utilizing linear-to-logarithmic conversion capability and one having a signal delay capability for one pulse repetition. The outputs are subtracted and are subsequently compared with a factor related to the root-mean-square (rms) of two deviation inputs, one input functionally related to apparatus limitations and one deviation input functionally related to antenna position (step between samples) for each signal received. The Doppler frequency standard deviation inputs are then summed rms and used to select an amplitude standard deviation which is compared with the amplitude difference between successive return signals. Thereafter, the logic decision output is operated on utilizing a digital filter to essentially eliminate ground clutter or small variance (PRF to PRf) return signals from the display.

17 Claims, 3 Drawing Figures

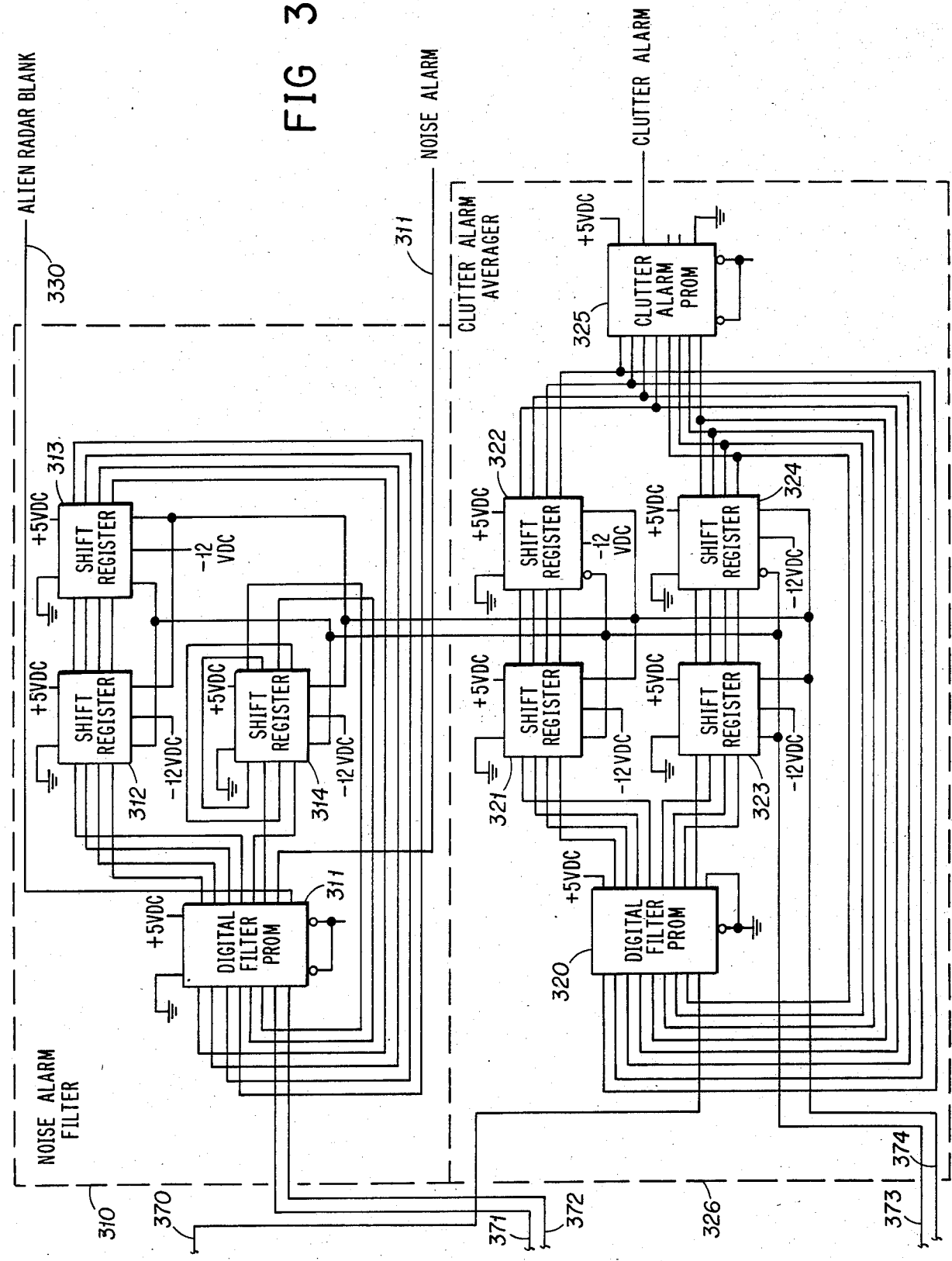

GROUND CLUTTER SUPPRESSION TECHNIQUE

BACKGROUND OF THE INVENTION

This invention relates to electronic radar in general and more particularly to weather radar having ground clutter identification capability.

Weather radar has been found to be extremely useful in locating thunderstorms and other forms of precipitation, thereby enabling improved accuracy in weather forecasts which allows pilots of aircraft to detour around these lightly hazardous regions.

The weather radar typically operates at relatively high frequencies since the precipitation, (raindrops, snow, hail) is composed of large numbers of relatively small radar targets and therefore the high frequency end of the radar spectrum has been found to be more effective in identifying these regions.

One significant problem observed with horizontally aimed or downward projecting weather radars has been the observance of "ground clutter" resulting from the radar reflections from stationary ground objects such as buildings, hills, etc. One approach to this problem has been the use of pulsed Doppler radar which can eliminate returns through electronic processing in the receiver from objects which are stationary relative to the broadcast station. The use of Doppler notch filters in this regard is described in U.S. Pat. No. 4,377,811 issued Mar. 22, 1983 entitled "Medium PRF Pulse Doppler Radar Having a Simplified Ground Moving Target Rejection Capabilities" to David H. Moonie, et.al. That technique is generally useful, however it is limited to stationary clutter and necessarily reduces the signal strength as a function of the filter capabilities and thereby reduces overall system performance. Additionally, when the weather radar is mounted on a moving platform, such as an aircraft, or when the ground targets additionally have a velocity component such as that caused by the wind disturbing leaves causing them to move relatively rapidly, these forms of ground clutter will not be effectively filtered by a Doppler notch filter.

It is known that the design techniques necessary for the detection of targets in a clutter background are considerably different from those techniques necessary for detection in a noise background. The text entitled "Introduction to Radar Systems" by Merrill I. Skolnik discusses these techniques in detail in Chapter 13, pp. 470-516, and is hereby incorporated by reference thereto.

Additionally, equipment limitations such as inherent receiver noise, radar transmitter stability, normal signal processing errors, and variances resulting from a wide variety of targets are potentially encounterable. Coupled with the problems associated with moving antennas, such as the angular movement between samples for a pulsed radar, and antenna beam width with the associated beam broadening, scan angle, and aircraft velocity, these problems provide significant hurdles in developing an aircraft mountable weather radar capable of rejecting moving ground clutter as well as compensating for aircraft velocity, while still providing an effective and useful representation of hazardous weather regions for the aircraft.

SUMMARY AND BRIEF DESCRIPTION OF THE INVENTION

Accordingly, it is an object of the present invention to provide a ground clutter circuit for use with a pulsed Doppler radar capable of detecting moving or stationary ground clutter from a weather radar display and capable of mounting and effective operation on a stationary or moving platform.

Another object of the present invention is to provide an airborne a weather radar system capable of detecting hazardous weather regions and eliminating ground clutter returns from the display.

Briefly, and in accordance with the present invention, a ground clutter identification circuit in a pulsed Doppler radar comprises a bifurcated parallel return signal processing circuit, one branch having a signal delay capability and both branches having linear-to-logarithmic conversion capability; and means for subtracting (combining to obtain the difference) the outputs of the processing circuit coupled thereto. The linear-to-logarithmic conversion enables the subtraction circuit to perform a division operation which normalizes the output with respect to the linear signal return level.

Furthermore, a circuit as above, in one embodiment, further comprises a deviation generator for generating in parallel at least one deviation input functionally related to apparatus limitations for each signal received, and for generating at least one deviation input functionally related to antenna beam positioning for each signal received. The apparatus limitations include transmitter stability, receiver signal-to-noise ratio, analog-to-digital conversion resolution error, root-mean-square (rms) estimation errors, and target variance. Antenna beam positioning deviation also includes antenna beamwidth effects such as beam broadening, scan angle, position change between samples and aircraft velocity in moving platform embodiments.

The deviations are rms summed and used to select a corresponding PRF to PRF amplitude correlation value which is subsequently compared with the logarithmic difference of the PRF to PRF return signals. The logic result is then processed through a digital filter for determining the ratio of signals exceeding a predetermined threshold to the number of samples, to thereby indicate clutter as a function of the ratio.

Alternate embodiments include means for detecting signal magnitude and generating a noise alarm as a function of the correlated signal magnitude above a predetermined threshold level, and additionally may include a circuit comprising an alien radar blanking circuit for detecting large signal magnitudes relative to average returns and for so indicating at an output.

A digital pulsed radar apparatus in accordance with the present invention for use with an antenna and having a ground clutter suppression circuit and a plurality of range cells comprises, in combination, a first means for receiving a first sequentially ordered plurality of return signals, the signals received in a cyclic manner controlled by the pulse repetition rate (PRF) of said apparatus, a second means coupled to the first means for converting the first ordered plurality of signals from a linear to a logarithmic representation, a third means coupled to the first means for delaying the first ordered plurality of signals for one pulse repetition, a fourth means coupled to the third means for converting the delayed plurality of signals from a linear to a logarithmic representation, and a fifth means coupled to the second means and to the fourth means for subtracting the converted first ordered plurality of signals and the converted delayed plurality of signals. Furthermore, the apparatus comprises a sixth means coupled to the first means for generating a signal deviation as a fixed function of the capability of the apparatus and providing a first deviation output, a seventh means for coupling to the antenna and for generating a signal deviation as a variable function of antenna angular step between samples, antenna scan angle position, and antenna beamwidth for each of said plurality of range cells and providing a second deviation output, an eighth means coupled to the sixth means and to the seventh means for rms summing the first deviation output and the second deviation output, a ninth means coupled to the eighth means for selecting a PRF to PRF amplitude correlation value based upon the summed deviations, and a tenth means coupled to the fifth means and to the ninth means for comparing the differentially converted signals with the summed deviation to provide a binary-one output indicating which of the received signals are less than a predetermined threshold.

An apparatus as above further comprises, in one embodiment, a digital filter coupled to the tenth means, for determining the ratio of the binary-one output to the number of samples (pulse repetition frequency) and thereby indicate clutter as a function of said ratio.

Other novel features, objects, and advantages of the invention will be apparent upon reading the following detailed description of an illustrative embodiment of the invention in conjunction with the drawings herein, in which:

FIG. 3 is a detailed schematic circuit diagram having the second portion of the circuitry shown in FIG. 1, having the noise alarm filter, clutter alarm averager, and clutter alarm, alien radar blank, and noise alarm outputs.

DETAILED DESCRIPTION OF THE DRAWINGS

Figure 1:
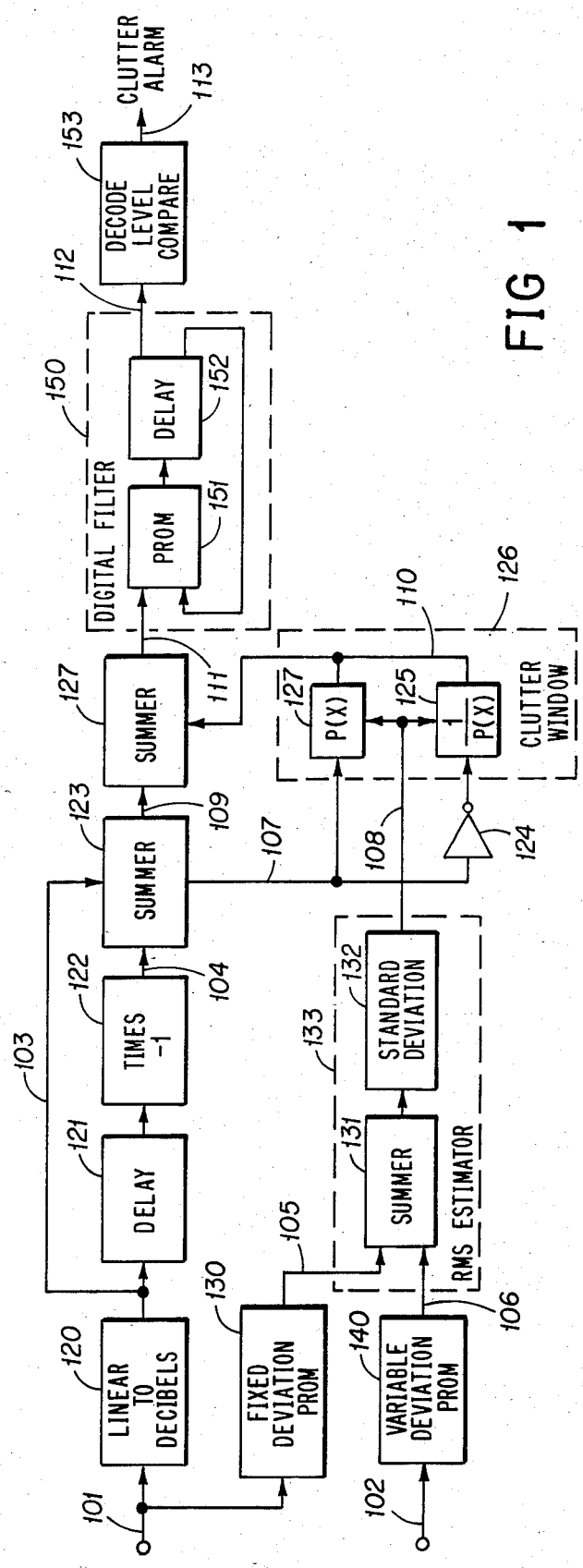
FIG. 1 is a schematic block diagram of the primary functions of one embodiment of the present invention shown in their proper relative positions.

Referring now to FIG. 1, a schematic block circuit diagram of one embodiment of the invented circuit is shown having the functional circuit units shown in their proper relative positions. The return signal from the radar receiver (in the presently described embodiment) is input on line 101 to the linear-to-decibel converter 120 and to the fixed deviation PROM 130. The fixed deviation PROM 130 contains correction factors resulting from equipment and other known fixed and signal/noise dependent sources and is designed to clarify the signal by providing a fixed deviation output on line 105 into summer 131. The variable deviation PROM 140 receives the position of the antenna information on line 102 and inputs a variable deviation on line 106 as a function of the antenna position, also into summer 131.

The RMS estimator 133 contains the summer 131 and a standard deviation generator 132 for providing a "normalized" output for deviation on line 108 to the clutter window generator block 126 and the normalized deviation is operated on the correlation function P either as P(x) or as 1/P(x) as a function of the sign of the signal from summer 123.

The linear-to-decibel converted signal from block 120 having been delayed by the shift register delay circuitry 121, and multiplied times −1 by block 122, is input on line 104 into the summer 123. The next subsequent arriving signal (at the same radar range but one PRF later), also converted by the linear-to-decibel converter 120, is input simultaneously on line 103 into summer 123 for summing with the negative of the delayed signal previously received. The sign of the result from summer 123 operates to select either the decibel correlation function value 127 in the clutter window generator 126 or the decibel inverse of the correlation function value 125. Inverter 124 is connected on line 107 to provide a positive input to the clutter window generator should the delayed signal have a larger value than the directly transmitted signal to summer 123. The actual signal value is output from summer 123 to summer 127 on line 109 and compared with the correlation function result from clutter window generator 126 having an input to summer 127 on line 110. The summer 127 (configured as a comparator) result, on output 111, will be a binary number (1 or 0) dependent upon the relative magnitude between inputs 109 and 110. Output 111 is processed through digital filter 150 having a programmable memory 151 coupled through a delay circuit 152 to provide an output on line 112 to the decode level compare circuitry 153 and thereby provide a clutter alarm on line 113.

In this manner, the fixed deviations resulting from receiver noise, aircraft velocity, transmitter stability, internal operation of the receiver and clutter circuitry such as the RMS estimator error, analog-to-digital conversion resolution, and potential target variance are compensated. The variable deviation is input into the circuit as a function of antenna scan angle position and is composed of the contributions of beam broadening (velocity and beamwidth) and antenna scan increment between samples, and varies as a function of antenna position for each signal received.

The correlation function P(x) in decibels is known in the art and is given herein:

$$P(x) = \frac{2\left(1 - \cos\frac{2\pi\sigma}{PRF}\right)}{\left(\frac{2\pi\sigma}{PRF}\right)^2}$$

where sigma is the standard deviation of the radar return based upon the expected Doppler variance, and PRF is the sampling rate, transmitter pulse repetition frequency.

With a stationary platform, the comparison threshold is fixed for all scan angles and the implementation is thereby simplified. Compensation of the threshold for detecting clutter must include corrections for receiver signal-to-noise ratio, transmitter stability, and variance introduced by the processor and other equipment used such as analog-to-digital conversion resolution. Additionally, for the airborne or moving platform, the implementation must further include additional threshold circuitry for clutter detection based upon aircraft velocity, antenna scan angle, antenna beam width, and antenna scan rate. These variables are included in the variable deviation PROM 140 whereas the fixed deviation threshold information is provided in fixed deviation PROM 130. Thus the amplitude fluctuation of the return signal is compared with a negative next subsequently received signal to obtain the difference between the first and second received signals, then compared with the correlation function, or its inverse as a function of the sign of the summed radar received signals, of the standard deviation of the radar return based on the expected Doppler standard deviation, $\sigma$. The signal is then processed through a digital filter to obtain a reliable digital output which is then compared to a decode level to determine if in fact clutter is to be deleted, through a video blanking circuit or other technique, from the display screen of the radar.

An additional significant advantage of the present invention is the ability to reduce the interference caused by the range side lobes by providing an operational method wherein the range bins of the radar are narrower than would normally be obtainable so that the total amount of clutter within the range bin is much smaller than the target cross-section. The narrowing of the range bins to enhance clutter rejection is known in the art; however, it has previously been limited by the operational instabilities, nonlinearities, and other inherent limitations in an operational system. By offsetting these shortcomings of the system utilizing the fixed deviation PROM as discussed above, the suppression of the range sidelobes is significantly enhanced.

Figure 2:
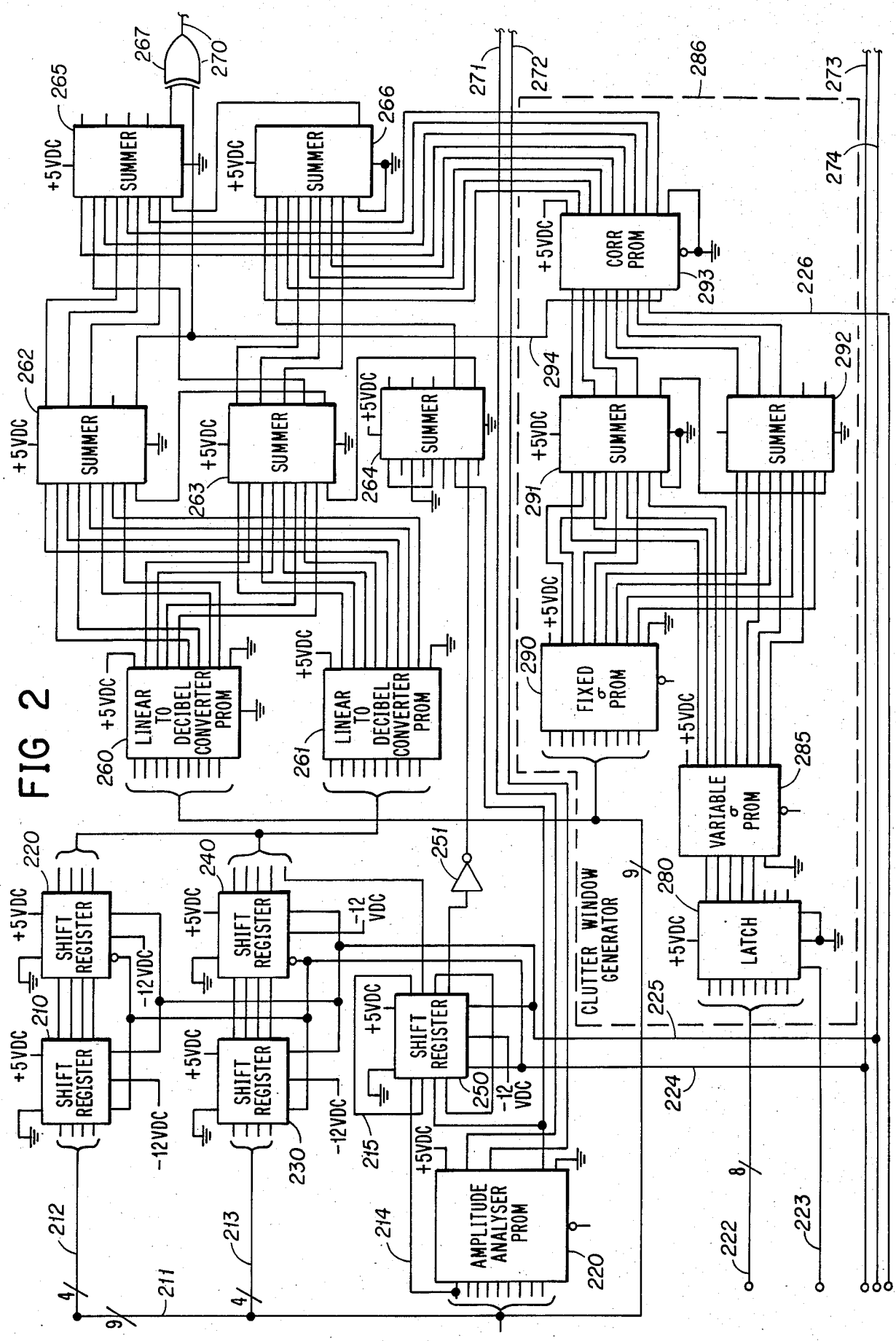
FIG. 2 is a detailed schematic circuit diagram of the first portion of the circuit shown in FIG. 1, having the clutter window generator and correction circuitry.

Referring now to FIG. 2, a detailed circuit diagram of a preferred embodiment of the present invention is shown wherein the nine-line bus 211 conducts a received radar signal in a digital format directly to the linear-to-decibel converter PROM 260, and to the fixed variance PROM 290. Additionally, four-line bus 212 and four-line bus 213 are input into shift registers 210 and 230, respectively, for a serial delay process approximately equal to one-half of the pulse repetition frequency (PRF). Thereafter, the delayed signal is input into shift registers 220 and 240 for the second half of the delay and thereafter into linear-to-decibel converter PROM 261. In this manner, the received signal is presented to the linear-to-decibel converter PROM 260 at the approximate same time as the previously received signal is presented to linear-to-decibel converter PROM 261.

The ninth bit of the signal is input on line 214 into shift register 250 which performs a first delay and then through looping back into the input of the serial shift register 250 on line 215, receives the second half of the delay, thereafter outputting into the linear-to-decibel converter PROM 261.

The amplitude analyzer PROM 220 is used primarily for a noise alarm and alien radar blanking functions and is connected to the nine-line bus 211 with an output coupled to shift register 250 with a loop for proper sample time relationship with the delayed signal, and outputs to the digital filters as will be described with reference to FIG. 3. The inverter 251 provides the negative of the delayed signal from amplitude analyzer PROM 220 into summer 264, also receiving the non-inverted, non-delayed signal from the amplitude analyzer PROM 220.

The digital decibel converted representation of the presently-received signal is output into summers 262 and 263 together with the delayed decibel representation of the previously received signal from PROM 261 and the sum thereafter is presented to summers 265 and 266 together which function as a comparator with a sign output coupled into the clutter alarm gate 267 and the correlation PROM 293.

The clutter window generator 286 relates the inherent fixed deviation error as a function of signal level through the fixed deviation PROM 290 which is summed by summers 291 and 292 with the variable deviation PROM 285 output. The variable deviation is a function of antenna position input into latch 280 from bus 222 as a function of the scan angle load control line 223. Once latched by latch 280, the variable deviation PROM 285 provides a deviation output to be summed into summers 291 and 292. The outputs of summers 291 and 292 are presented to the correlation PROM 293 which provides a signal output into summers 265 and 266 for summing with the previously processed and decibel converted signals. The binary sign (+ or −) output of the comparator results from summers 265 and 266 is input into gate 267 to provide a clutter alarm signal on line 270 to the circuitry shown in FIG. 3.

Referring now to FIG. 3, the clutter alarm signal on line 370 is input into the clutter alarm averager 326 comprising a digital filter PROM 320 having a delay loop utilizing the shift registers 321, 322 in series as well as 323, 324 in series to provide an 8-bit output to the clutter alarm PROM 325 as a function of multiple receptions of the clutter alarm signal from the summers 265, 266 and a sign qualifying input from summer 262 of FIG. 2.

The noise alarm filter 310 looks at two outputs 371 and 372 of the amplitude analyzer PROM 220. Input 371 is present whenever the signal level exceeds threshold level, while input 372 is present whenever the signal level exceeds a much higher threshold level indicative of a higher target level or alien radar. Input 371 is averaged by the noise alarm filter to determine a sufficient number of returns above threshold prior to removal of the noise alarm, which inhibits the display. Input 372 is observed sequentially PRF to PRF to determine if single target hits are registered, whereby they are removed from further processing by the Alien Radar blank output, and the noise alarm filter is returned to its nominal noise resting level. If single target hits are not received, the noise alarm filter is allowed to respond to input 371.

The clutter alarm averager 326 receives input 270 which is the PRF to PRF decision of ground clutter present/absent. The recursive filter provides a continuously updated time average to determine if the average of these decisions is 68.3 percent (1 sigma). If this is true, the clutter alarm is set.

The clock line 373 is coupled to each of the shift registers in the clutter alarm averager 326 as well as noise alarm filter 310 for clocking the shift registers and the pulse transmit cycle control line 374 is also coupled to the shift registers 321-324, 312-314, in the clutter alarm averager 326 and the noise alarm filter 310, respectively, for synchronizing the digital filters with respect to the pulse/transmit cycle.

Having described the hardware and its interconnection for a preferred embodiment of the present invention, a typical operation sequence description follows to provide a clear understanding of the actual functioning of the previously described hardware.

Referring to FIG. 1, a radar return signal is input on line 101 to the receiver apparatus of FIG. 1 and presented to the linear-to-decibel converter 120, thereafter into the delay circuit 121 and the times −1 (negative multiplier) circuit 122 into summer 123. Each subsequently received decibel signal is additionally presented to summer 123 on line 103. In operation, each received decibel signal is summed with the negative of the subsequently received signal and the output is thereafter presented on line 109 to summer 127.

Essentially simultaneously with the above operation, the received signal on bus 101 is presented to the fixed deviation PROM 130 wherein a known, predetermined deviation as a function of equipment capability, is presented on line 105 to summer 131 in combination with the variable deviation PROM 140 output on line 106. The antenna position is presented on line 102 providing an antenna position dependent deviation output on line 106 which is then summed and input into the standard deviation function circuitry 132, and thereafter on line 108 into the clutter window circuitry 126. The correlation function decibel solution is essentially selected by the sign of the signal presented on line 107 from summer 123 to select either the correlation function P(x) 127 or its inverse, 1/P(x), 125, converted to decibels. The output on line 110 from the clutter window generator 126 is then compared with the signal in summer 127 and presented to the digital filter 150 for the long-time correlation previously discussed, and thereafter output on line 112 into the decode level compare circuitry 153 for indicating a clutter alarm signal on line 113.

An important and useful variation of the presently-described embodiment comprises a plurality of data bases for the respective functions of each of the PROMs previously discussed which are selectable dependent upon the PRF (pulse repetition frequency) of the radar. The deviations as well as the correlation functions will have a significant PRF dependent change and in a radar having a selectable PRF, multiple data bases for each desired PRF are preferred.

What is claimed is:

1. In a pulsed Doppler radar, a ground clutter identification circuit comprising:
   a bifurcated parallel return signal processing circuit, one branch having a signal delay capability and both branches having linear-to-logarithmic conversion capability and respective outputs;
   a deviation generator circuit for generating at least one deviation input functionally related to apparatus limitations for each signal received; and
   means for summing said outputs of said processing circuit, coupled to both branches and to said deviation generator circuit.

2. A circuit as in claim 1 further comprising a second deviation generator for generating at least one deviation input functionally related to antenna positioning for each signal received, in parallel with said first deviation generator, and coupled to said means for summing the outputs of said processing circuit.

3. A circuit as in claim 2 further comprising means coupled to said deviation generators for summing and correlating said deviation inputs.

4. A circuit as in claim 3 further comprising means, coupled to said means for summing outputs of said processing circuit and coupled to said means for summing and correlating said deviation inputs, for indicating signals exceeding a predetermined threshold.

5. A circuit as in claim 4 further comprising a digital filter coupled to said means for indicating signals, for determining the ratio of signals exceeding a predetermined threshold to the number of samples and thereby indicate clutter as a function of said ratio.

6. A circuit as in claim 4 further comprising means for detecting signal magnitude and generating a noise alarm as a function of correlated signal magnitude above a predetermined threshold level.

7. A circuit as in claim 4 further comprising an alien radar blanking circuit for detecting large signal magnitudes relative to average returns, and for so indicating at an output.

8. In a pulsed Doppler radar, a ground clutter indication circuit comprising:
   a deviation generator for generating in parallel at least one deviation input functionally related to apparatus limitations for each signal received, and for generating at least one deviation input functionally related to antenna scan position and rate for each signal received; and
   means coupled to said deviation generator for summing and correlating said deviation inputs.

9. A circuit as in claim 8 further comprising:
   a bifurcated parallel return signal processing circuit, one branch having a signal delay capability and both branches having linear-to-logarithmic conversion capability; and
   means for summing the outputs of said processing circuit coupled thereto, and coupled to said means for summing and correlating said deviation outputs.

10. A circuit as in claim 9 further comprising means, coupled to said means for summing outputs of said processing circuit and coupled to said means for summing and correlating said deviation inputs, for indicating signals exceeding a predetermined threshold.

11. A circuit as in claim 10 further comprising a digital filter, coupled to said means for indicating signals, for determining the ratio of signals exceeding a predetermined threshold to the number of samples and thereby indicate clutter as a function of said ratio.

12. A circuit as in claim 10 further comprising means for detecting signal magnitude and generating a noise alarm as a function of correlated signal magnitude above a predetermined threshold level.

13. A circuit as in claim 10 further comprising an alien radar blanking circuit for detecting single large signal magnitudes over a sequence of returns, and for so indicating at an output.

14. A digital pulse radar apparatus for use with an antenna and having a ground clutter suppression circuit and a plurality of range cells comprising in combination:
   a. first means for receiving a first sequentially ordered plurality of returned signals, said signals received in a cyclic manner controlled by the pulse repetition rate of said apparatus;
   b. second means, coupled to said first means, for converting said first ordered plurality of signals from a linear to a logarithmic representation;
   c. third means, coupled to said first means, for delaying said first ordered plurality of signals for one pulse repetition;
   d. fourth means, coupled to said third means, for converting said delayed plurality of signals from a linear to a logarithmic representation;
   e. fifth means, coupled to said second means and to said fourth means, for summing said converted first ordered plurality of signals and said converted delayed plurality of signals;
   f. sixth means, coupled to said first means, for generating a signal deviation as a fixed function of the capability of said apparatus and providing a first deviation output;
   g. seventh means for coupling to said antenna and for generating a signal deviation as a variable function of antenna scan position, scan rate and antenna beamwidth for each of said plurality of range cells, and providing a second deviation output;

h. an eighth means, coupled to said sixth means and to said seventh means, for summing said first deviation output and said second deviation output;

i. ninth means, coupled to said eighth means, for correlating the Doppler frequency standard deviation of said summed deviations to the amplitude standard deviation; and j. tenth means, coupled to said fifth means and to said ninth means, for summing said summed converted signals with said summed deviations to provide binary outputs indicating which of said received signals exceed a predetermined threshold.

15. An apparatus as in claim 14 further comprising a digital filter, coupled to said tenth means, for determining the ratio of said binary outputs to the number of samples and thereby indicate clutter as a function of said ratio.

16. An apparatus as in claim 15 further comprising means for detecting signal magnitude and generating a noise alarm as a function of correlated signal magnitude above a predetermined threshold level.

17. An apparatus as in claim 15, further comprising an alien radar blanking circuit for detecting single large signal magnitudes over a sequence of returns, and for so indicating at an output.

* * * * *